United States Patent
Bernhardt

[11] 4,007,831
[45] Feb. 15, 1977

[54] CARTRIDGES CONTAINING SELF-SETTING MIXES

[76] Inventor: Frederick William Bernhardt, 39 Algernon St., Oatley, New South Wales 2223, Australia

[22] Filed: Oct. 8, 1975

[21] Appl. No.: 620,602

Related U.S. Application Data

[63] Continuation of Ser. No. 371,653, June 19, 1973, abandoned.

[52] U.S. Cl. .............................. 206/219; 61/45 B; 229/56
[51] Int. Cl.² ................. B65D 25/08; B65D 31/12
[58] Field of Search ............... 206/219, 221, 222; 61/45 B; 229/56, 72; 215/DIG. 8

[56] References Cited

UNITED STATES PATENTS

| | | | |
|---|---|---|---|
| 3,385,427 | 5/1968 | Stouls | 229/57 |
| 3,680,389 | 8/1972 | Grunoschober et al. | 206/222 |
| 3,698,196 | 10/1972 | Jankowski et al. | 61/45 B |
| 3,699,687 | 10/1972 | Bourland | 61/45 B |
| 3,731,791 | 5/1973 | Fourcade et al. | 206/219 |
| 3,737,027 | 6/1973 | Ball | 206/219 |
| 3,756,388 | 9/1973 | Murphy | 206/219 |
| 3,861,522 | 1/1975 | Liewellyn et al. | 229/56 |
| 3,913,733 | 10/1975 | Flesch et al. | 206/219 |
| 3,915,297 | 10/1975 | Rausch | 206/219 |

FOREIGN PATENTS OR APPLICATIONS

| | | | |
|---|---|---|---|
| 2,082,713 | 11/1971 | France | 206/219 |

*Primary Examiner*—William Price
*Assistant Examiner*—Bruce H. Bernstein
*Attorney, Agent, or Firm*—Caesar, Rivise, Bernstein & Cohen, Ltd.

[57] ABSTRACT

A cartridge containing the inter-active components of a resin mix such as a polyester, epoxy or polyurethane, comprises tubular flexible containers, each containing an interactive component, the containers being sealed to prevent egress of their contents, the containers lying in side-by-side relation and preferably secured together by an adhesive such as a double sided adhesive tape.

8 Claims, 3 Drawing Figures

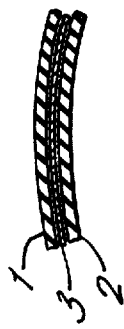
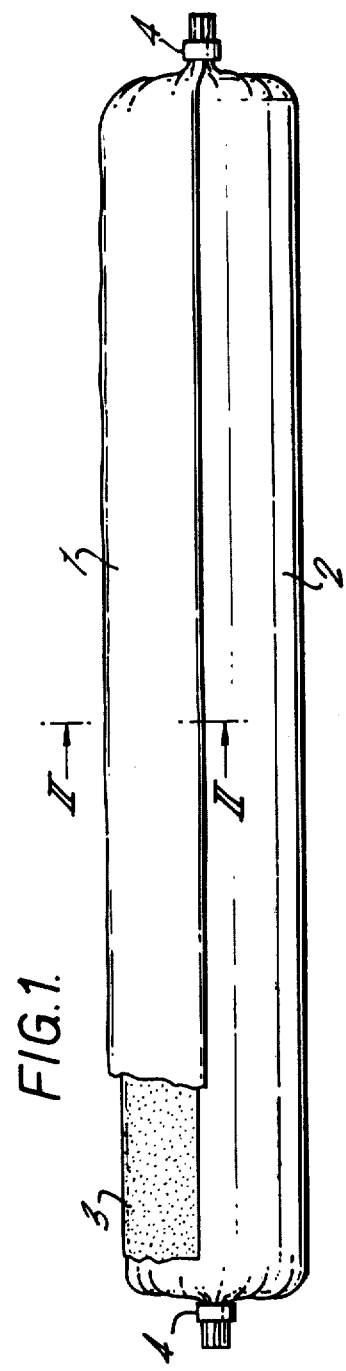
FIG. 1.
FIG. 2.
FIG. 3.

CARTRIDGES CONTAINING SELF-SETTING MIXES

This is a continuation of application Ser. No. 371,653, filed June 19, 1973, now abandoned.

The invention relates to securing a fixing element in a substrate, for example an anchor bolt in a rock bore hole, using a self-setting mix.

It is known to embed a fixing element in a hole in a substrate by filling the hole with a synthetic resin mix which has been prepared on site. This may be inconvenient because the site may be relatively inaccessible and measuring out precise quantities of the ingredients of the mix requires skilled expensive labour.

There have been numerous proposals to provide a cartridge containing preproportion quantities of components of the mix packaged in such a way that they do not interact until required. For example, in the case of a polyester resin mix, one component comprising the unsaturated resin, as accelerator and filler material may be held in one part of the cartridge while the other component, comprising a hardener, is held in a separate part of the cartridge. Specifically the unsaturated resin may be a polyester, and the accelerator dimethyl aniline or cobalt naphthenate while the hardener therefor is an acyl peroxide such as benzoyl peroxide, methyl ethyl ketone peroxide or cyclohexanone perioxide. None of these proposals has been wholly satisfactory from the point of view of manufacture, storage life and effectiveness in use.

According to the invention, the interactive components, of a self-setting mix are packaged in a cartridge, each component being located in a tubular flexible container sealed at each end, the containers lying in side-by-side relation and being secured together.

The containers may be secured together by means of an adhesive which may be applied as a coating in continuous or discontinuous stripe form. In a preferred arrangement use is made of a tape having a contact or impact adhesive on both sides and containers, each having an interactive component, are adhered to the sides of the tape to form the cartridge. An advantage of the use of adhesive is that the two containers need not be secured together until the cartridge is to be inserted in a hole; manufacture is thus considerably simplified because individual containers may be stored until required. The tape tends to enhance shredding of the container walls when the cartridge is ruptured by a fixing element, dependent on the relative strengths of the tape and container walls.

The flexible containers are preferably formed of a synthetic plastics film such as polyethylene, polypropylene, polyvinyl chloride or polyethylene terephthalate, or a viscose paper. For manufacture, the film is preferably shaped into continuous lay flat tubing sealed at one end into which is then fed a respective interactive component. An interactive component may be fed into the tubing and the other end sealed, and two (or more) tubings, each having a respective interactive component then secured together in side-by-side relation or the tubings may be secured together first following which the components may be fed into the respective tubings, either simultaneously or consecutively, and then sealed at the other end. In the second case use may be made of preformed bitubular firm. The containers may share a common sealing means at each end, and the sealing means may be a compression clip, or a length of wire or string.

The interactive components are preferably formulated of a synthetic resin such as a polyester, epoxy or polyurethane. One component may comprise a resin and accelerator or modifier with a filler, and the other a hardener or catalyst therefor, also with a filler. For some systems there may be three or more components each having a separate container. Generally, and especially in the case of a polyester resin, the hardener will be of relatively smaller volume and for this reason the container for the hardener component will be relatively smaller. Preferably the container having the major volume component is filled to generally circular cross-sectional shape and the other container is partially filled with its component and is secured to a circumferential portion thereof which tends to ensure that when a fixing element is driven into a hole in which the cartridge is received the container walls will be torn to release the interactive components to react to form a secure anchorage.

An embodiment of the invention will now be described with reference to the accompanying diagrammatic drawings, in which:

FIG. 1 is a side elevation of one cartridge, parts having been cut away, and

FIG. 2 is a sectional view taken on lines 11—11 of FIG. 1, and

FIG. 3 shows a detail of FIG. 2 on a relatively enlarged scale.

The cartridge comprises two containers 1 and 2 joined by means of a double side adhesive tape 3. Each container comprises a tubular bag of a plastics skin, preferably a saturated polyester, both containers being sealed at each end by means of one metal clip 4. The lower container 2 is filled to circular cross-sectional shape with a mixture of an unsaturated polyester, fillers and accelerator. The upper container 1 is partially filled with a hardener mixture of a peroxide and fillers and then secured by means of the tape 3 to a circumferential portion of the lower container 2 to assume a generally convexo-concave shape. An amin-accelerated unsaturated polyester system marketed under the trade name "Crystic" is suitable and this may contain as filler a mixture of fine sand and limestone in a resin-to-total filler weight ratio of 1:4 and the hardener therefor may be benzoyl peroxide dispersed in dibutyl phthalate and mixed with a filler or ground limestone and silica in a hardener-to-total-filler weight ratio of 1:2. As best shown in FIG. 3, the tape 3 is adhered to the upper side portion of the container 2 and to the underside of the container 1 to hold the two containers together along the majority of their length. The cartridge may have a total diameter as low as 8 mm, although generally 16 mm is the lowest diameter required, and a length of from say 60 mm to 1 meter or more. Because the two interactive components are located in separate containers, the shelf life of the cartridge is that of the individual components, and may range up to a year or more, dependent on ambient temperature.

Reference is hereby made to pending U.S. application Ser. No. 253,041 which involves the use of a cartridge in connection with the fixing of a bolt in a hole. The cartridge and the method of the present invention are readily adaptable to the technique of said application Ser. No. 253,041.

In an evaluation to test the anchoring ability of the cartridges, holes were drilled in concrete having a compressive strength of about 3,000 p.s.i. using a rotary percussive drill to a depth and of a diameter as specified below. Into each hole was inserted a cartridge having a mean diameter specified below and of a length appropriate to that of the depth of the hole. A bolt similar to GK60 rebar (made by Guest Keen and Nettleford, England) was rotated into the hole to rupture the cartridge to intermix the interactive components to form the self-setting mix to anchor the bolt. After twenty four hours a load test was performed to see the load required to separate the bolt from the concrete. The results obtained from several experiments are set out below:

| Cartridge diameter (mm) | Hole diameter and depth (mm) | | Bolt diameter (mm) | Pull-out strength (KN) (maximum) |
|---|---|---|---|---|
| 22 | 25 | 100 | 13 | 89 |
| 22 | 25 | 100 | 16 | 89 |
| 22 | 25 | 152 | 20 | 134 |
| 32 | 40 | 228 | 25 | 178 |
| 32 | 40 | 228 | 32 | 178 |

Without further elaboration, the foregoing will so fully illustrate my invention that others may by applying current or future knowledge readily adapt the same for use under various conditions of service.

What is claimed as the invention is:

1. A cartridge containing first and second inter-active components of a self-setting mix, said cartridge comprising a first container filled with a first component of said self-setting mix so that first container assumes a generally circular cross-sectional shape, said cartridge further comprising a second container partially filled with a second component of said self-setting mix such that said partially filled second container assumes a generally convex outer surface and a generally concave inner surface, said containers extending longitudinally and lying in a side-by-side relationship, said second container being formed into a generally convexo-concave shape with said second container being positioned against a circumferential portion of said first container and adhesive means contacting said containers to join said containers to form a cartridge.

2. The cartridge of claim 1 wherein said adhesive means is an adhesive tape.

3. The cartridge of claim 2 wherein said adhesive tape is a double side adhesive tape interposed between said containers.

4. A cartridge containing inter-active components of a self-setting mix, said cartridge comprising a first container filled with a first component of self-setting mix, said cartridge further comprising a second container partially filled with a second component of a self-setting mix, said containers extending longitudinally, each of said containers being sealed at both ends, said containers lying in a side-by-side relationship and secured together to form a cartridge, said first container being filled to assume a generally circular cross-sectional shape and said second container being partially filled to have a generally convex outer surface and a generally concave inner surface in contact with said first container when placed in said side-by-side relationship.

5. The cartridge of claim 4 including adhesive means interposed between said first container and said second container.

6. The cartridge of claim 5 wherein said adhesive means is an adhesive tape.

7. The cartridge of claim 6 wherein said adhesive tape is a double sided adhesive tape.

8. The cartridge of claim 7 wherein said adhesive tape is a double sided adhesive tape.

* * * * *